United States Patent Office 3,634,235
Patented Jan. 11, 1972

3,634,235
DRILLING FLUID AND METHOD OF USE
Doyne L. Wilson and Robert B. Bennett, Houston, Tex., assignors to Oil Base, Inc., Houston, Tex.
No Drawing. Filed Dec. 21, 1967, Ser. No. 692,298
Int. Cl. C10m 1/08
U.S. Cl. 252—8.5 M    4 Claims

ABSTRACT OF THE DISCLOSURE

Pre-treatment or post-treatment of oil base drilling fluids for oil well applications for purposes of stabilizing the fluid against deterioration upon contamination with water base drilling fluids, with or without clay solids, is effected by adding to the oil base fluid an amphoteric surface-active agent containing both anionic and cationic surface-active groups. Exemplary compounds which are extremely effective surface-active agents in this function are amines and betaines which contain one or more carboxyl or carboxylate groups. Enhanced effects are also available employing such amphoteric compounds with sulfonate type anionic surface-active agents.

BACKGROUND OF THE INVENTION

The instant invention relates to the drilling of oil and gas wells. In particular, the instant invention relates to novel oil base drilling fluids and other fluids used in connection with the drilling of oils, to methods of use of these fluids, and to treatment of these fluids to preserve desired properties under adverse conditions of use.

In the art of drilling wells, especially drilling by rotary method, it is necessary to circulate a drilling fluid or mud in the borehole to cool and lubricate the drill bit, to carry cuttings to the surface, and to control formation pressure. In addition, it is desirable, if not necessary, that the mud form a filter cake on the walls of the well which will minimize the loss of filtrate or drilling fluid to the formation being drilled.

However, in order to maintain sufficient hydrostatic head to balance formation pressures, the weight of a drilling fluid is made to vary, from about 7.5 pounds per gallon to as much as 20 or more pounds per gallon. The weight of the drilling fluid is controlled by the addition of varying amounts of a finely divided weighting agent such as limestone, barium sulfate, iron oxide, or the like.

Some underground formations contain water-sensitive clays and shales which swell and disintegrate when contacted by water base muds and/or the filtrate from the mud permeating the formation. This creates an acute drilling problem. If such water contamination occurs in an oil zone, the well productivity may be seriously impaired. To avoid drilling and well damage problems of this nature, it has become customary to use oil base drilling fluids which are substantially free of water and which lose only oil as a filtrate to the formation and accordingly cause no swelling or disintegration of water-sensitive clays and shales.

It is essential in such oil base drilling fluids that the weighting solids be dispersed in an oil-wet condition. The development of such a hydrophobic condition has been accomplished by the addition of suitable emulsifying agents which are well known in the art. However, under conditions of use, an oil base fluid can become contaminated with water. Particularly when this contamination accrues from water-base mud containing clay solids and thinning agents such as lignosulfonates, the integrity of the oil base drilling fluid is in danger. It has been postulated that lignosulfonates attach themselves on clay particles by valence attraction and effect the hydrophilic clay dispersion condition which is desirable for clay-water muds. When the water base mud introduces clay solids to contaminate the oil base mud or when clay contamination from the drilling formation is a factor, there is a tendency for the solid weight particles in the oil base mud to become water-wet rather than remaining in the desired oil-wet state.

Such contamination of oil base muds becomes a serious problem during a drilling fluid changeover when clay-water mud in the hole is displaced by the oil base mud, and weighted oil base muds in particular, just prior to drilling into the oil zone. Under such conditions, if the oil base mud becomes so contaminated that the weight solids begin to hydrate and agglomerate, the problems of settling become severe, the viscosity of the oil base mud increases undesirably, and the mud in general assumes a "fluffy" and a generally unusable condition.

Thus, although the necessity of maintaining solids in oil base mud in a hydrophobic or oil-wet condition is constantly a problem due to water contamination and contamination with hydrophilic clays, the problem may become especially acute when the oil base mud is exposed to water, water-base mud and certain additives of water-base muds during changeover. These contaminants can act chemically and/or physically on the ingredients of the system to mitigate against the maintenance of the integrity of the oil base mud.

SUMMARY OF THE INVENTION

It is accordingly an object of this invention to preserve the integrity of oil base fluids under adverse contaminating conditions in a borehole.

It is another object of this invention to provide novel oil base drilling fluids and other oil base oil fluids which overcome the difficulties presented by contamination with water, water-wet clay solids, and the other ingredients of water-base muds.

Another object of this invention is to provide a method for treating an oil base drilling fluid preparatory to use in a system where contact with a clay-water mud is contemplated to minimize the adverse effects of such contact and to maintain the mud solids in an oil-wet and dispersed condition.

Another object of this invention is to provide a method for post-treating an oil base mud after contamination with a clay-water mud so as to restore the oil base system to a hydrophobic solid condition.

A further object of this invention is to provide novel oil base fluids which can be readily employed for spotting around a stuck drill pipe in a hole where clay-water mud is being employed which fluid does not suffer the risk of becoming seriously contaminated prior to its arrival at the region of sticking.

Another object of this invention is to provide a method for pre-treating an oil base fluid so as to minimize the interaction at the interface between the oil base fluid and a clay-water mud in the hole, thus permitting the smooth passage of logging and other equipment downhole.

A further object of this invention is to provide a method to maintain or restore viscosity and gel properties to an oil base system after contamination with water, a clay-water dispersion, or a clay-water mud, which treatment may be used prior to or subsequent to contamination.

A further object of this invention is to provide a novel treatment for oil base fluids to prevent the adverse effects caused by contaminations described above which treatment is thoroughly compatible with other desired additive of the oil base system.

In accordance with the instant invention, the above and related objects are achieved by incorporation in an oil base drilling fluid a small but effective amount of an oil-soluble or oil-despersible amphoteric surface-active agent sufficient to maintain the weighting solids in an oil-wet state in the presence of a water base drilling mud. These amphoteric compounds are capable of maintaining or restoring the desired viscosity and gel characteristics to an oil base fluid, for example, an oil base drilling mud, even in the presence of high contaminating amounts of a lignosulfonate water base mud.

Amphoteric surface-active agents, sometimes referred to an ampholytic surface-active agents, contain both acidic and basic groups in the same molecule. Hence such compounds possess the characteristics, at least in part, of both cationic and anionic surface-active agents. The anion-forming group in the amphoteric surface-active agents of this invention can typically include the carboxyl or carboxylate groups, the sulfonic acid, sulfonic ester or sulfonate group. In addition, other anion-forming groups such as phosphonic acid groups and the like can function to impart amphoterism to a suitable additive also containing a cationic group. Typical of the cationic groups which are also present in the molecule of the surface-active agents of this invention are secondary or tertiary amine groups or quaternary nitrogen-containing groups.

The amphoteric surface-active agents employed in accordance with the instant invention are completely compatible with other surface active agents which may be present in the oil base fluid system. Thus, the use of the surface-active agents of this invention does not preclude the use of cationic, anionic, or nonionic surfactants such as disclosed in the prior art. In some cases, the combination of the amphoteric additives of this invention with other additive contributes an enhanced ability of the oil base system to resist water contamination from all the various sources from which it can arise.

DESCRIPTION OF THE SPECIFIC EMBODIMENTS

Amphoteric surface-active agents form a group of compounds which have long been known by structure. The structure and preparation of a number of these compounds are discussed by Schwartz et al., Surface-Active Agents, Interscience Publishers (1949).

In oil base well fluids, these amphoteric compounds provide a combination of properties not otherwise attainable. The presence of both anion forming and cation forming groups in the amphoteric compound gives the compound a dual character depending upon the pH of the solution in which it exists. For example, considering a simple N-alkyl β-aminopropionic acid, in the acid range the compound is a cationic amine salt while in the alkaline range the compound is a carboxylate salt. However, in the mid-pH range, i.e., the isoelectric range, the amphoterism of the compounds of this invention is evident and the compound exhibits special properties. This may be schematically illustrated with the N-alkyl β-aminopropionic acid as follows (wherein M is a metal such as sodium or calcium).

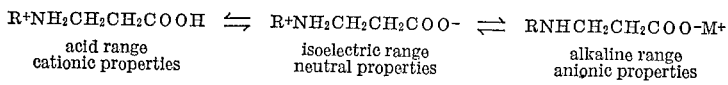

| acid range | isoelectric range | alkaline range |
| cationic properties | neutral properties | anionic properties |

In its isoelectric range, the amphoteric surface-active agent exhibits minium solubility in water, minimum foaming, minimum wetting and the like. Under all but the most severe conditions, however, it is thought that an equilibrium of all three forms of the amphoteric compound exists.

It is postulated that in oil base fluids, the amphoteric compounds of this invention act as effective sequestering agents for the clays and other solid particles dispersed in the fluid. As such, they maintain the solid in an oil-wet as opposed to a water-wet condition and hence maintain oil base fluid integrity.

However, it will be understood that since the anion or cation forming propensities of the amphoteric compounds of this invention can be controlled by control of the pH of the fluid, the operator can readily control the effects of these compounds in the fluid. Hence by alteration of pH, as by addition of lime to the fluid, the properties and performance of the amphoteric additive can be tailored somewhat to meet the demands on the fluid.

Typically, oil base fluids operate as alkaline systems and carry a substantial alkaline reserve because of the lime content. Thus, most typically the amphoteric additives of this invention most likely function as anionic surfactants. However, their performance in maintaining the oil base fluid integrity far surpasses performance of known anionic surfactants. This may be accounted for by the fact that except at the extremes of the pH range, there is postulated to be an equilibrium condition in which the amphoterics of this invention exist in all three forms illustrated above.

The amphoteric compounds which may be employed in accordance with this invention may contain one or more of various acid moieties to contribute anionic properties and also may contain different basic moieties to impart the cationic character to the compounds. The compounds of this invention include amines and betaines (i.e., quaternary nitrogen compounds) of various acids such as carboxylic acids, sulfonic acids, or phosphonic acids or salts of these acids.

The amphoteric compounds of this invention also conveniently contain at least one fatty alkyl group in the molecule. As will be appreciated by those skilled in the art, the number and the size of this fatty alkyl group or groups will control, in significant part, the water solubility of the amphoteric compound. Most typically, the fatty alkyl group is bonded directly to the nitrogen atom of the secondary or tertiary amine group which forms the basic and cation-forming portion of the amphoteric compound. However, this is not critical and the fatty alkyl may be bonded other than to the amino or betaine nitrogen, particularly in the case of azacyclic compounds wherein the amine or betaine nitrogen forms part of an azacarbocyclic ring as will be seen by reference to exemplary compounds below. The fatty alkyl group preferably has from 8 to about 20 carbon atoms and most often is a straight chain substituent.

It is pointed out that the fatty alkyl group may be part of an alkaryl moiety, an alkoxyalkyl moiety or the like. Indeed the fatty alkyl group performs the function of rendering the amphoteric compounds at least partially water insoluble in the same manner that such groups function with other surfactants. Thus, the nature of this substituent can vary depending upon the function desired. Most often as stated above, the alkyl group extends directly from the amine or betaine nitrogen atom.

Thus, the amphoteric compounds which may be used in accordance with the novel compositions and treatment methods of this invention include as a first preferred group the amines and betaines of carboxylic acids or carboxylic acid salts, such as the metal salts, quaternary ammonium salts and the amine salts of carboxylic acids. These compounds may be conveniently represented by the formula.

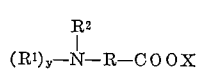

wherein y is an integer from 1 to 2;

X is hydrogen; a metal preferably an alkali or alkaline earth metal; an quaternary ammonium group (i.e., $-NH_4^+$); or an amine group for forming a primary, secondary, or tertiary amine salt with the carboxy group;

R is a hydrocarbylene group, preferably a straight or branched chain alkylene group, such as methylene, ethylene, isopropylene usually containing 1 to about 10 carbon atoms in the alkylene chain;

Each $R^1$ individually is hydrocarbyl which may be substituted with noninterfering group such as ether groups, or R—COOX;

$R^2$ is hydrogen; hydrocarbyl; or together with an $R^1$ group forms a substituted or unsubstituted azacyclic ring.

Preferably at least one of the group $R^1$, $R^2$, or R contains a long chain pendent fatty alkyl group to render the compound at least partially water insoluble. It may be seen by the above formula that when $y$ is 1, the basic or cation-forming portion of the compound is a secondary or tertiary amine whereas when $y$ is 2 the nitrogen cation is quaternary and the compound is a betaine.

Illustrative of amphoteric surface-active agents in accordance with this embodiment which may be employed in the novel compositions of this invention and in the novel treatment procedures herein provided include:

The N-fatty β-imino dialkanoic acids, the corresponding disubstituted metal N-fatty β-imino dialkanoates and the partial salts of said acids wherein one carboxyl group has been converted to a metal salt:

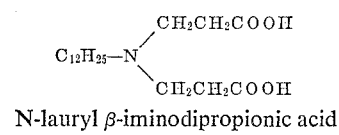

N-lauryl β-iminodipropionic acid

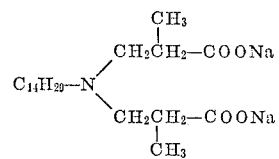

Disodium N-myristyl β-iminodiisobutyrate

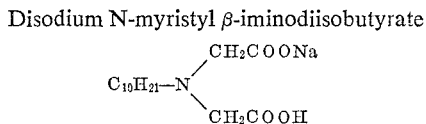

Partial sodium salt of N-capryl β-iminodiacetic acid

The N-fatty aminoalkanoic acids and the metal substituted N-fatty aminoalkanoates also including compounds wherein the amine nitrogen atom is contained within an otherwise all carbon ring:

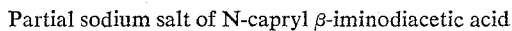

Isopropyl amine salt of N-stearyl β-aminopropionic acid

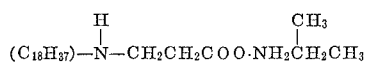

Ammonium salt of N-lauryl-β-aminopropionic acid

Ethyl amine salt of mixed lauryl-myristyl aminoacetic acid

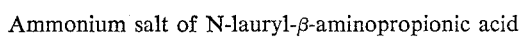

β-Piperidino myristic acid

The carboxylic acid betaines including betaines wherein the quaternary nitrogen atom exists in an azacarbocyclic ring:

$$C_{12}H_{25}N^+(CH_3)_2CH_2COO^-$$

N-dodecyl-N,N-dimethyl betaine (inner salt form)

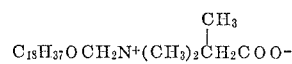

N-octadecyloxymethyl-N-N-dimethyl-γ-propiobetaine

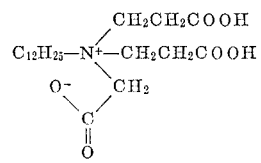

N-lauryl-β-iminodipropionic acid betaine

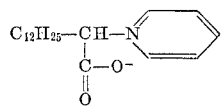

β-pyridinium myristic acid betaine

In a second aspect, the amphoteric compounds of this invention include the amines and betaines of sulfonic acid and sulfonic acid salts. These compounds correspond to the above formula wherein the carboxy group (—COO) is replaced by the sulfonic acid grouping —SO$_3$. Thus these compounds may be represented.

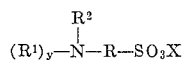

wherein X, y, $R^1$, $R^2$, and R designate the same groups as above. Illustrative compounds include derivatives of taurine (i.e., 2-aminoethanesulfonic acid):

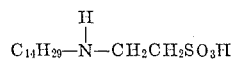

N-myristyl-β-taurine

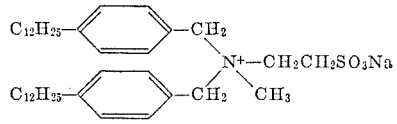

Sodium salt of N,N-dilauryl phenylmethyl-N-methyl-2-ethanesulfonic acid betaine

In accordance with a still further aspect of this invention the amphoteric compounds include the amines and betaines of phosphonic acids and salts wherein the carboxy group is replaced by phosphono, e.g.:

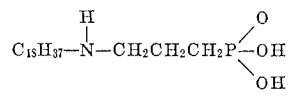

N-stearyl-γ-amino propanephosphonic acid

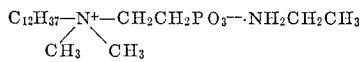

Ethyl amine salt of N-stearyl-N,N-dimethylamino propanephosphonic acid betaine

This betaine of phosphonic acid carries a net negative charge of one.

The above amphoteric compounds include amine salts of the various acids as described above. Sulfonic acid and phosphonic acid will exist in the amine salt form more readily than a carboxylic acid which tends to react with the amine to form an amide. Such an amidification is not desirable and accordingly such amine salts are not preferred for use under conditions wherein borehole temperature might result in reaction of the amine salt to form the amide.

Though the most preferred metal in the amphoteric metallic salts disclosed above is sodium, other metals such as potassium, calcium, and the like of the alkali and alkaline earth groups may be used.

A suitable group of the most preferred amino carboxylic acid type amphoteric compounds is sold by General Mills under the trade name "Deriphat."

Thus, the amphoteric compounds in accordance with all three aspects of this invention may be represented

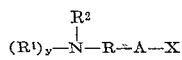

wherein A is carboxy (—COO) or sulfo (—SO$_3$) or phosphono (—PO$_3$) and the remaining symbols retain their designation as above. Of course, in the case of a phosphono compound or the like, it will be understood that X represents the requisite number of valence satisfying substituents, e.g., X would represent 2 hydrogen atoms in the case of phosphonic acid.

Other compounds which contain amine and carboxyl or carboxylate groups may also be employed as will be obvious to those skilled in the art.

Compounds of this nature may be synthesized by a variety of reactions known in the art. For example, the preferred carboxylic acid compounds in accordance with the above structure are formed by reaction of, for example, an alkyl amine with a halogenated carboxylic acid. The reaction of an alkyl amine with chloroacetic acid can proceed to form both the secondary and tertiary amine, as well as the N-alkyl amino acetic acids and the N-alkyl amino diacetic acids and the corresponding betaines R$^1$NH$_2$ + ClCH$_2$COOH ⟶ R$^1$NHCH$_2$COOH R$^1$NHCH$_2$COOH + ClCH$_2$COOH ⟶ R$^1$N—(CH$_2$COOH)$_2$ R$^1$N—(CH$_2$COOH)$_2$ + ClCH$_2$COOH ⟶

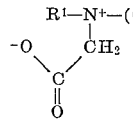

Another synthesis for the amino propionates and amino propionic acids which are highly useful in the compositions and treatment methods of this invention involves the condensation of a primary amine with acrylic acid or methacrylic acid or the like to add the amine across the double bond. The primary amine is preferably one formed from a long chain fatty acid (by reaction with ammonia (thus often the novel compounds, when formed from naturally occurring fatty acids which have been converted to amines, will contain various fatty substituents corresponding to the alkyl groups of the acids.

CH$_2$=CHCOOH+RNH$_2$→RNHCH$_2$CH$_2$COOH and

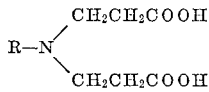

Thus, if for example, coco oil, tallow oil (basically C$_{18}$) or the like is employed in syntheses of the amine, the resulting mixture of alkyl groups on the amphoteric compound will correspond to those in the oil.

Other syntheses can involve the reduction of a Schiff's base formed by the reaction of an alkyl aldehyde and an amino acid to obtain an N-alkyl carboxylic acid. Of course, it will be appreciated by those skilled in the art that the conversion of the above acids as synthesized above to the corresponding carboxylates may be readily accomplished by conventional saponification or like reactions.

The above reactions can be conducted with a multitude of synthesizing compounds to give a multitude of compounds which have both the anionic carboxyl or carboxylate groups and cationic amino or quaternary nitrogen groups. Analogous reactions can be employed to obtain the sulfonic and phosphonic acid compounds.

As above stated, the compounds of this invention are characterized by a fatty chain usually extending from the nitrogen atom. The size of this fatty chain will control the solubility of the amphoteric agents of this invention in water. For example, a lauryl or C$_{12}$ chain will produce an otherwise more water soluble compound than would a stearyl or C$_{18}$ chain on the same amino carboxylate nucleus. Thus the desired solubility of the treating agents of this invention can be readily selected and synthesized by selecting the fatty amine during synthesis. Similarly the number of carboxyl or carboxylate groups on the molecule increase solubility as well as the foaming or detergency characteristics of these amphoteric oil fluid treatment additives. Thus it can be appreciated that the selection of desired properties is simple and readily ascertainable.

With further reference to the structural formula above it may be seen that the size and nature of the R, R$^1$, and R$^2$ substituents is not critical. It is only preferred that at least one of these groups provide the molecule with a long chain fatty alkyl to control water solubility, generally containing from 4 to about 22 carbon atoms usually at least 8 carbon atoms. More preferably, the R moiety is not a hydrocarbon chain of more than about 3 or 4 carbon atoms since such chain length begins to affect water solubility which can be more conveniently controlled by the length of the fatty alkyl group.

The novel treatment in accordance with the instant invention is accomplished by addition of small amounts of amphoteric additive which may range as low as one-quarter pound per barrel and yet be sufficient to effectively maintain the solids in an oil-wet state in the face of contamination. Normally, the additives of this invention will not be required in amounts exceeding 8 pounds per barrel, and certainly amounts in excess of this will not generally be added as a pre-treatment. But it will be understood that amounts as large as 25 pounds per barrel may be employed, especially when post-treating a severely contaminated fluid. It is further understood that the novel treatment of this invention may be carried out using other conventional additives such as an alkyl aryl sulfonate in addition to amphoteric additives to obtain enhanced stabilizing effects. The entire additive treatment may involve the addition of greater amounts of combined additive.

The amphoteric additives of the instant invention are uniquely suited for employment with surface-active agents of varying types commonly found in oil base fluids. The amphoteric surface-active agents of this invention are compatible with anionic surface-active agents, cationic surface-active agents, and nonionic surface-active agents which might desirably be employed in such fluids. Thus the amphoteric compounds of this invention may be employed with amine or quaternary ammonium surface-active agents; with anionic agents such as the alkyl aryl sulfonates; and with nonionic surface-active agents such as the polyalkylene glycol alkyl phenyl ethers.

In particular, the novel amphoteric compounds of this invention function with singular efficacy in stabilizing oil base drilling fluids when employed together with anionic surface-active agents of the type disclosed in U.S. Pat. No. 3,099,624 including the alkyl aryl sulfonic acids and the alkyl aryl sulfonates. These alkyl aryl sulfonates are usually employed in minimum amounts slightly greater than the minimum amounts of amphoteric additives of this invention. Thus the alkyl aryl sulfonates are present in amounts of from about 1 to about 6 pounds per barrel of fluid sometimes extending to as high as 30 pounds per barrel. Pre-treating a fluid with such a combination additive system, the amphoteric additive of this invention may be used in amounts of from 90% to 10% of the total additive amount. But more practically because of economics, the amphoteric additive is added in lesser amounts than the sulfonate additive. These anionic sulfonate additives are extremely effective in combatting water contamination alone; however, in combination with the amphoteric additives of this invention, these anionic surface-active agents provide a flexible and less costly additive system than the amphoteric compounds alone suitable to prevent deterioration of properties from oil base mud contamination by water base muds, brine, water-clay mixtures, and the like.

Suitable sulfonate compounds are those disclosed in the above-mentioned U.S. Pat. No. 3,099,624. These compounds commonly comprise a common aromatic nucleus which has been alkylated and sulfonated. The compounds generally contain at least two fatty alkyl groups of from 10 to 30 carbon atoms. The compounds may be described as oil-soluble or oil-dispersible alkyl, aralkyl or cycloalkyl aromatic sulfonic acids and sulfonates in which the aromatic nucleus may be monocyclic or polycyclic, and which may be halogenated or contain noninterfering substituents such as hydroxyl, halogen, or amino.

Specific exemplary compounds, which are more fully disclosed in U.S. 3,099,624 include: didodecylbenzene sulfonic acid; sodium didodecylbenzene sulfonate; calcium didodecylbenzene sulfonate; amylamine didodecylbenzene sulfonate; didodecylnaphthalene sulfonic acid; N-heptadecylindole sulfonic acid; oleyl-N-ethyloctadecylanilide sulfonic acid; and oleyl-p-anisidide sulfonic acid.

The amphoteric additives of this invention will be used primarily with oil base drilling fluids, i.e., oil base drilling muds. Such oil base drilling muds are well known to the art and contain blown asphalt, hydrate of lime, a gel-producing agent such as calcium naphthenate or the like, and weighting materials such as barite as well as a small percentage of water. It is when these drilling fluids are weighted to high densities of 12 pounds per gallon or more that the problem with maintaining solids in the oil-wet state in face of aqueous contamination becomes difficult. The mud may contain one or more surface-active agents of the types known in the art to assist in maintaining the oil as the continuous phase.

However, it will be understood that the amphoteric additives of this invention are also effective to stabilize other oil base fluids such as packer fluids or annular fluids and packs, perforating fluids or spotting fluids employed to release stuck drill pipe. The integrity of maintaining a water-in-oil emulsion in the event of water contamination in all such fluids is essential to their proper functioning and hence the additives of this invention can be used for these varied fluids as well.

The amphoteric additives of this invention are preferably employed to pre-treat a well fluid to resist contamination by incorporation of the additive prior to exposure of the fluid to the potentially contaminating environment of the borehole. Altough pre-treatment of the fluid is always preferred and is usually more effective, post-treatment of a fluid already contaminated during its use by adding the amphoteric compounds directly to an oil base fluid circulating through the borehole may be necessary to restore the fluid to a workable condition.

It will be appreciated by those skilled in the art that the instant invention broadly provides a method to treat as oil base well fluid to maintain its integrity even under extremely adverse contaminating conditions. Accordingly, variations of this invention as will be obvious to those skilled in the art can be undertaken without departure from the spirit or scope of this invention.

The following examples are illustrative:

EXAMPLE 1

In a field trial on a well at Padre Island, Kleberg County, Tex., a lignosulfonate water base mud was displaced from a well using an oil base drilling fluid made in accordance with U.S. Pat. No. 2,475,713 and sold under the trademark "Black Magic Supermix" by Oil Base, Inc., assignee hereof. This drilling fluid as disclosed by this patent, and as is well known to those skilled in the art contains blown asphalt and calcium naphthenate to provide a good gel structure in the fluid. This material was weighted to 12.9 pounds per gallon and there was added to the fluid 1.5 pounds per gallon of a petroleum sulfonate surface-active agent as described in U.S. Pat. 3,099,624. The oil base fluid was then treated with 0.5 pound per barrel of disodium N-lauryl β-imino dipropionate. After three washovers of more than 300 feet each at depths of below 5500 feet, tests of all samples of the mud indicated that the mud did not become unduly viscous and suffered no top settling and only trace bottom settling of weighting agents. The integrity of the water in oil emulsion measured with a Fann Emulsion Stability Meter after exposure of the oil base fluid to the borehole showed an electrical stability to 240 volts which did not decrease through the entire 3-day period indicating constant maintenance of emulsion integrity.

EXAMPLE 2

A sample of unused oil base drilling fluid left over from the shipment of fluid employed in the above hole was weighted with barium sulfate to 18 pounds per gallon. The fluid was contaminated with a lignosulfonate water base mud until the oil base fluid "flipped" and an oil-in-water emulsion was formed. Two successive amounts of disodium N-laury - β - iminodipropionate were added to the fluid, each successive amount corresponding to 1 pound per barrel of the additive. The electrical stability measurements on the system illustrate how the additive restored a water-in-oil emulsion in the fluid.

|  | Elec. stab. (volts) |
|---|---|
| Before contamination | 480+ |
| After contamination | 0 |
| 1 lb./bbl. additive | 140 |
| 2 lb./bbl. additive | 200 |

EXAMPLE 3

A number of laboratory samples of an oil base drilling mud were formulated by first preparing an unweighted phase by blending 42.5 grams blown asphalt, 11.0 grams of lime, 3.5 grams of an alkyl aryl sulfonate (sold by Oil Base, Inc. under the trademark Special Additive 47) 300 cc. of diesel oil and 17.5 cc. of water. To 85 parts of this unweighted phase was added 15 parts of diesel oil and the mixture was again blended. Ground barium sulfate was added to the resulting mixture in amount to produce a mud density of 18 pounds per barrel.

Various supplemental additives blended with samples of the above fluid in amounts to provide the following concentration of supplemental additive on a pounds per barrel basis.

| Sample No. | Supplemental additive | Lb./bbl. |
|---|---|---|
| 1 | None | |
| 2 | Special additive 47 | 3 |
| 3 | do | 2 |
| 4 | Alkylolamide A (sold under trade name Witco 512) | 1 |
| 5 | Alkylolamide A | 1.5 |
| 6 | Dodecyl diphenyl ether disulfonic acid sodium salt | 3 |
| 7 | Alkylolamide B (sold under trade name Witco P10-59) | 1.5 |
| 8 | Disodium N-lauryl iminodipropionate | 1.5 |

Each sample was tested at 150° F. on a Fann Meter (Model 35) to obtain apparent viscosity ($V_a$) and plastic viscosity ($V_p$) as well as yield point (YP). The samples were then contaminated with 10 percent by volume of a water base lignosulfonate mud by blending in a Waring Blendor.

| Sample No. | Viscosity, 150° F. | | | Appearance after contamination |
|---|---|---|---|---|
| | $V_a$ | $V_p$ | YP | |
| 1 | | | | Thick. |
| 2 | 75 | 58 | 34 | Thick, grainy, fluffy, water wet solids. |
| 3 | 72 | 59 | 26 | Very thick, grainy, fluffy. |
| 4 | 72 | 58 | 28 | Do. |
| 5 | 76 | 58 | 36 | Slight grain. |
| 6 | 71 | 57 | 28 | Do. |
| 7 | 52 | 42 | 20 | Smooth, no effect. |

Identical amounts of supplemental additives as added above were then blended into each sample. The electrical stability of the emulsion was then determined as above with a Fann emulsion stability meter.

| Sample No. | Appearance after additive | Electrical stability (volts) |
|---|---|---|
| 2 | Smoothed out, trace grain | 400 |
| 3 | do | 360 |
| 4 | do | 0 |
| 5 | Smooth, very fluid, trace grain | 480 |
| 6 | do | 300 |
| 7 | do | 440 |

It may be seen that Sample 7 using the additives of this invention was least affected by the lignosulfonate mud. Furthermore at lower concentrations than other additives the amphoteric compounds were able to maintain the oil base fluid integrity.

What is claimed is:

1. A method of treating an oil base well fluid containing weighting material in an oil or gas well under conditions wherein aqueous contamination from a water base lignosulfonate containing mud is encountered comprising adding to said fluid a small amount, sufficient to maintain said weighting material in an oil wet state, of an amphoteric iminodialkanoic acid of the formula:

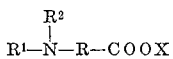

X is hydrogen, alkali metal or $-NH_4^+$,
R is alkylene having up to 4 carbon atoms in the alkylene chain;
$R^1$ is R—COOX; and
$R^2$ is a long chain fatty alkyl having from about 8 to 22 carbon atoms.

2. The method of claim 1 which includes adding to said fluid with said amphoteric surface-active agent a small amount of an alkyl aryl sulfonic acid or alkyl aryl sulfonate.

3. The method of claim 1 wherein said agent is disodium N-lauryl-β-iminodipropionate.

4. The method of claim 1 wherein said agent is the partial sodium salt of N-lauryl-β-iminodipropionic acid.

References Cited

UNITED STATES PATENTS

| | | | |
|---|---|---|---|
| 2,491,436 | 12/1949 | Barnes | 252—8.5 C |
| 2,793,189 | 5/1957 | Schuessler | 252—8.5 P |
| 2,468,012 | 4/1949 | Isbell | 252—89 X |
| 2,697,656 | 12/1954 | Stayner et al. | 44—72 |
| 2,797,196 | 6/1957 | Dunn et al. | 252—8.5 |
| 2,885,360 | 5/1959 | Haden et al. | 252—8.5 X |
| 3,099,624 | 7/1963 | Wilson | 252—8.5 |

OTHER REFERENCES

Schwartz et al., Surface Active Agents and Detergents, vol. II, 1958, published by Interscience Pub. Inc. of New York, p. 141.

Moore, Ampholytic Surface Active Agents, article in J. Soc. Cosmetic Chemists, vol. 1, No. 1, January 1960, pp. 13 to 25.

HERBERT B. GUYNN, Primary Examiner

U.S. Cl. X.R.

252—8.5 P